US012761115B2

United States Patent
(12) United States Patent
Suzuki et al.

(10) Patent No.: US 12,761,115 B2
(45) Date of Patent: Oct. 13, 2026

(54) OPTICAL FIBER CHARACTERISTIC MEASUREMENT APPARATUS AND OPTICAL FIBER CHARACTERISTIC MEASUREMENT METHOD

(71) Applicant: Yokogawa Electric Corporation, Musashino (JP)

(72) Inventors: Yuta Suzuki, Musashino (JP); Shin-ichirou Tezuka, Musashino (JP); Masayoshi Honma, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 72 days.

(21) Appl. No.: 18/739,798

(22) Filed: Jun. 11, 2024

(65) Prior Publication Data

US 2024/0426702 A1 Dec. 26, 2024

(30) Foreign Application Priority Data

Jun. 21, 2023 (JP) ................................ 2023-102017

(51) Int. Cl.
*G01M 11/00* (2006.01)

(52) U.S. Cl.
CPC ............................... *G01M 11/3109* (2013.01)

(58) Field of Classification Search
CPC ................................................. G01M 11/3109
See application file for complete search history.

(56) References Cited

U.S. PATENT DOCUMENTS

| | | | | |
|---|---|---|---|---|
| 11,506,521 | B2 | 11/2022 | Matsuura | |
| 2007/0159621 | A1 | 7/2007 | Ukita | |
| 2010/0092127 | A1 | 4/2010 | Sasaoka et al. | |
| 2010/0128257 | A1* | 5/2010 | Yamamoto ........ | C03B 37/02745 356/73.1 |
| 2013/0025374 | A1* | 1/2013 | Voskoboinik ...... | G01D 5/35364 73/655 |
| 2021/0325210 | A1* | 10/2021 | Matsuura ........... | G01D 5/35364 |

FOREIGN PATENT DOCUMENTS

| | | | |
|---|---|---|---|
| EP | 3848677 | A1 | 7/2021 |
| JP | 2007-187473 | A | 7/2007 |
| JP | 2008-082771 | A | 4/2008 |
| JP | 2008-216123 | A | 9/2008 |
| JP | 2020-41843 | A | 3/2020 |
| KR | 10-2022-0168863 | A | 12/2022 |

OTHER PUBLICATIONS

Extended European Search Report dated Nov. 25, 2024, issued in counterpart application No. 24181636.2. (9 pages).
Office Action dated Feb. 3, 2026, issued in counterpart JP Application No. 2023-102017, with English translation. (8 pages).

* cited by examiner

*Primary Examiner* — Jamil Ahmed
(74) *Attorney, Agent, or Firm* — WHDA, LLP

(57) ABSTRACT

An optical fiber characteristic measurement apparatus includes an arithmetic unit configured to measure the characteristic of an optical fiber under test by extracting multiple peaks in a Brillouin gain spectrum of Brillouin scatted light occurring in the optical fiber under test.

7 Claims, 6 Drawing Sheets

OPTICAL FIBER CHARACTERISTIC MEASUREMENT APPARATUS AND OPTICAL FIBER CHARACTERISTIC MEASUREMENT METHOD

CROSS-REFERENCE TO RELATED APPLICATION

This application claims priority to Japanese Patent Application No. 2023-102017, filed on Jun. 21, 2023, the entire contents of which are incorporated herein by reference.

TECHNICAL FIELD

The present disclosure relates to an optical fiber characteristic measurement apparatus and an optical fiber characteristic measurement method.

BACKGROUND

Conventionally, methods of measuring the characteristics of optical fibers by obtaining Brillouin frequency shifts (BFSs) of Brillouin scattering occurring in the optical fibers are known. For example, see Patent Literature (PTL) 1.

CITATION LIST

Patent Literature

PTL 1: JP 2020-41843 A

SUMMARY

An optical fiber characteristic measurement apparatus according to some embodiments includes an arithmetic unit configured to measure the characteristic of an optical fiber under test by extracting multiple peaks in a Brillouin gain spectrum of Brillouin scatted light occurring in the optical fiber under test.

An optical fiber characteristic measurement method according to some embodiments includes measuring the characteristic of an optical fiber under test by extracting multiple peaks in a Brillouin gain spectrum of Brillouin scatted light occurring in the optical fiber under test.

The optical fiber characteristic measurement apparatus and the optical fiber characteristic measurement method according to the present disclosure can reduce a measurement time for the characteristic of an optical fiber.

DETAILED DESCRIPTION

Figure 1:
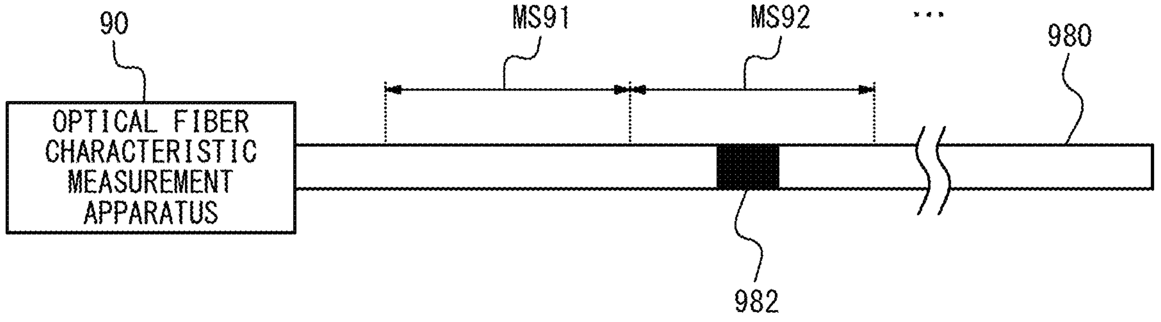
FIG. 1 is a diagram illustrating measurement segments set widely by an apparatus according to a comparative example.

In a case in which a BFS is determined as the frequency of a single peak detected in a Brillouin gain spectrum (BGS), spatial resolution to measure the BGS must be set shorter than an anomalous portion of an optical fiber. Here, shortening the spatial resolution increases the number of segments in each of which the BGS is to be detected so that the optical fiber can be entirely measured in its length direction. Increasing the number of the segments in each of which the BGS is to be detected elongates the time required to detect the BGSs in the entire optical fiber whose characteristic is to be measured. As a result, a measurement time for the characteristic of the optical fiber becomes longer. It would be helpful to provide an optical fiber characteristic measurement apparatus and an optical fiber characteristic measurement method that can reduce a measurement time for the characteristic of an optical fiber.

(1) An optical fiber characteristic measurement apparatus according to some embodiments includes an arithmetic unit configured to measure the characteristic of an optical fiber under test by extracting multiple peaks in a Brillouin gain spectrum of Brillouin scatted light occurring in the optical fiber under test. By extracting each of the multiple peaks in the Brillouin gain spectrum, the optical fiber characteristic measurement apparatus is less likely to miss an anomaly included in part of a measurement segment even when the measurement segment is set long. As a result of allowing the measurement segment to be set long, a measurement time for the characteristic of the optical fiber is reduced.

(2) In the optical fiber characteristic measurement apparatus according to (1) above, the arithmetic unit may be configured to:

- set, at at least one position in the optical fiber under test, a measurement segment in which the characteristic of the optical fiber under test is to be measured;
- measure a Brillouin gain spectrum in the measurement segment set at each position;
- determine, as an anomaly, the characteristic of the measurement segment in which the Brillouin gain spectrum including an anomalous peak and no normal peak has been measured;
- subdivide the measurement segment in which the Brillouin gain spectrum including both of a normal peak and an anomalous peak has been measured;
- measure a Brillouin gain spectrum in each subdivided segment; and
- determine whether each subdivided segment is anomalous. By subdividing the measurement segment including an anomaly and repeating the measurement, the range in which the measurement segments are set short is limited. Setting the short measurement segments in only part of the optical fiber under test can reduce the measurement time for the characteristic of the optical fiber.

(3) The optical fiber characteristic measurement apparatus according to (2) above may further include a light source configured to emit modulated light to be incident on the optical fiber under test. The light source may be configured such that the arithmetic unit can control the amplitude of the modulated light, which determines the length of the measurement segment, and the modulation frequency of the modulated light, which determines the position of the measurement segment. By allowing the position and length of the measurement segment to be determined by controlling the modulation frequency and amplitude of the modulated light, the measurement position and spatial resolution of the measurement can be switched instantaneously. In other words, random accessibility can be achieved. The spatial resolution of the measurement can be switched instantaneously by allowing the length of the measurement segment to be determined by controlling the modulation frequency and amplitude of the modulated light. As a result, the subdivision of the measurement segment can be easily realized.

(4) The optical fiber characteristic measurement apparatus according to (3) above may further include a memory configured to store the measured Brillouin gain spectrum and information identifying the measurement segment in which the Brillouin gain spectrum has been measured, in correspondence with each other. The arithmetic unit may be configured to control the amplitude and modulation frequency of the modulated light based on information stored in the memory.

(5) An optical fiber characteristic measurement method according to some embodiments includes measuring the characteristic of an optical fiber under test by extracting multiple peaks in a Brillouin gain spectrum of Brillouin scatted light occurring in the optical fiber under test.

The optical fiber characteristic measurement apparatus and the optical fiber characteristic measurement method according to the present disclosure can reduce a measurement time for the characteristic of an optical fiber.

To measure the temperature, strain, or other characteristics of optical fibers at each position in length directions, methods of detecting scattered light or reflected light occurring in the optical fibers, in response to light incident on the optical fibers, are conceivable. The Brillouin optical correlation domain reflectometry (BOCDR) is one of the methods to measure the characteristics of the optical fibers. The BOCDR includes having pump light, which is split from frequency-modulated light, incident on an optical fiber, and detecting interference light generated by interference between reference light split from the modulated light and Brillouin scattered light occurring in the optical fiber. The Brillouin scattered light is backscattered light occurring by Brillouin scattering caused by the pump light incident on the optical fiber, and returns to an end on which the pump light has been incident.

The BOCDR further includes obtaining a spectrum of the Brillouin scattered light from a signal of detecting the interference light. The spectrum of the Brillouin scattered light is also referred to as a Brillouin gain spectrum (BGS). In the BOCDR according to the present disclosure, the BGS is detected by performing a spectral analysis of the interference light, which is generated by the interference between the reference light and the Brillouin scattered light by offsetting the frequency of the reference light.

The peak frequency of the BGS is determined by the characteristic of the optical fiber in which the Brillouin scattered light is measured. Therefore, by calculating the peak frequency of the BGS, the characteristic of the optical fiber is measured. The peak frequency of the BGS is also referred to as a Brillouin frequency shift (BFS).

In the BOCDR, the Brillouin scattered light is selectively extracted in a specific segment in which a correlation peak appears in the optical fiber by the interference between the Brillouin scattered light and the reference light. The correlation peak is a peak that appears in the interference light by an intensification between the Brillouin scattered light and the reference light. The specific segment in which the correlation peak appears is a segment, in the optical fiber, in which the Brillouin scattered light that intensifies with the reference light and causes the correlation peak of the interference light to appear occurs. In the BOCDR, by determining the BFS at the position of appearance of the correlation peak, the temperature, strain, or another characteristic of the optical fiber at that position can be measured. The specific segment in which the correlation peak appears is also referred to as a measurement segment to measure the characteristic of the optical fiber.

The measurement segment is set at at least one position in the optical fiber. The position of the measurement segment is determined according to the modulation frequency of the pump light and the reference light. In other words, the position of the measurement segment is set at any position in the optical fiber by controlling the modulation frequency of the pump light and the reference light.

Peaks appearing in the interference light are periodically located in the length direction of the optical fiber. Therefore, the measurement segments are periodically located in the length direction of the optical fiber. In other words, the multiple measurement segments are located in the length direction of the optical fiber. The Brillouin scattered light occurring in each measurement segment returns to the end at a time difference corresponding to a difference in distance. Therefore, the BGS in each measurement segment can be distinguished by a difference in time for the Brillouin scattered light to return from each measurement segment.

In the BOCDR, by moving the measurement segments and obtaining the BFS from the BGS in each measurement segment, variations in temperature, strain, or another characteristic at individual positions of the optical fiber in its length direction can be detected. As a result, a temperature distribution, a strain distribution, or another characteristic distribution in the length direction of the optical fiber can be measured.

The length of the measurement segments is determined according to the amplitude of the pump light. Specifically, the smaller the amplitude of the pump light, the shorter the measurement segments. The shorter the measurement segments, the higher the resolution of the characteristic of the optical fiber in the length direction. On the other hand, in order to measure the optical fiber entirely in the length direction, the shorter the measurement segments, the shorter the intervals to sweep the modulation frequency need to be. The shorter the intervals to sweep the modulation frequency, the greater the number of changes of the modulation frequency needs to be to make the entire optical fiber in the length direction as the measurement segments. As a result, a time required to measure the entire optical fiber in the length direction increases. In other words, a trade-off occurs between the resolution of the characteristic of the optical fiber in the length direction and the time required to measure the entire optical fiber in the length direction. In other words, the shorter the spatial resolution to measure the BGS, the greater the number of target segments in each of which the BGS is to be detected so that the optical fiber can be measured entirely in the length direction. The greater the number of the target segments in each of which the BGS is to be detected, the longer the time required to detect the BGSs in the entire optical fiber whose characteristic is to be measured.

Comparative Example

As illustrated in FIG. 1, an optical fiber characteristic measurement apparatus 90 according to a comparative example measures the characteristic of an optical fiber under test 980 by having pump light incident on the optical fiber under test 980. The optical fiber characteristic measurement apparatus 90 controls the modulation frequency and amplitude of the pump light so that a BGS can be measured in each of a first measurement segment represented by MS91 and a second measurement segment represented by MS92. The optical fiber under test 980 has an anomalous portion 982 in which temperature, strain, or another characteristic is anomalous. The anomalous portion 982 is located in the second measurement segment.

Figure 2A:
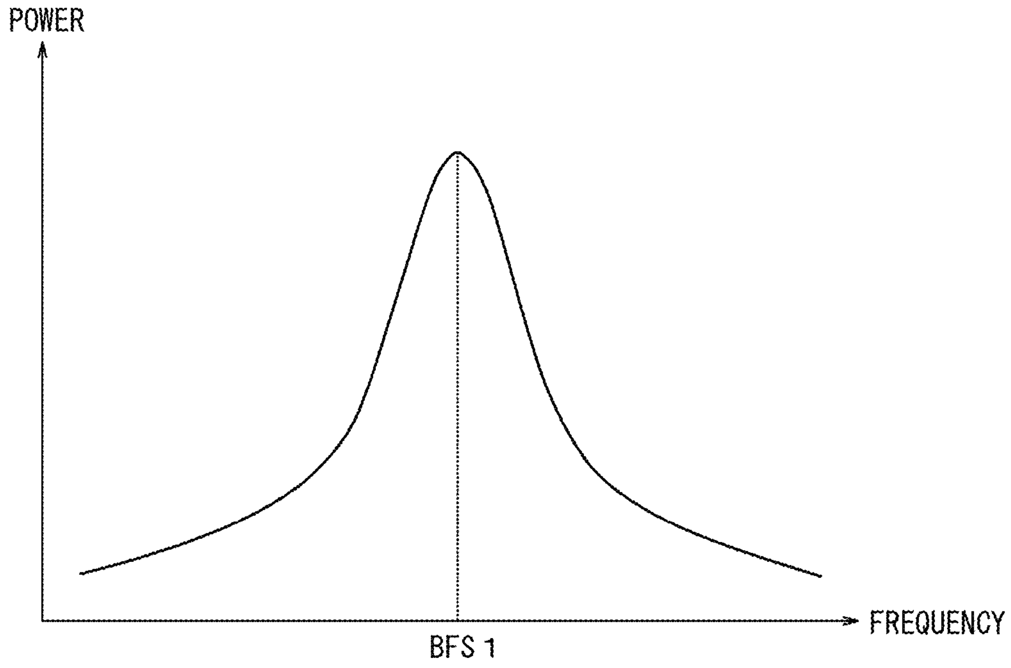
FIG. 2A is a graph of a Brillouin gain spectrum in a measurement segment including no anomalous portion.
Figure 2B:
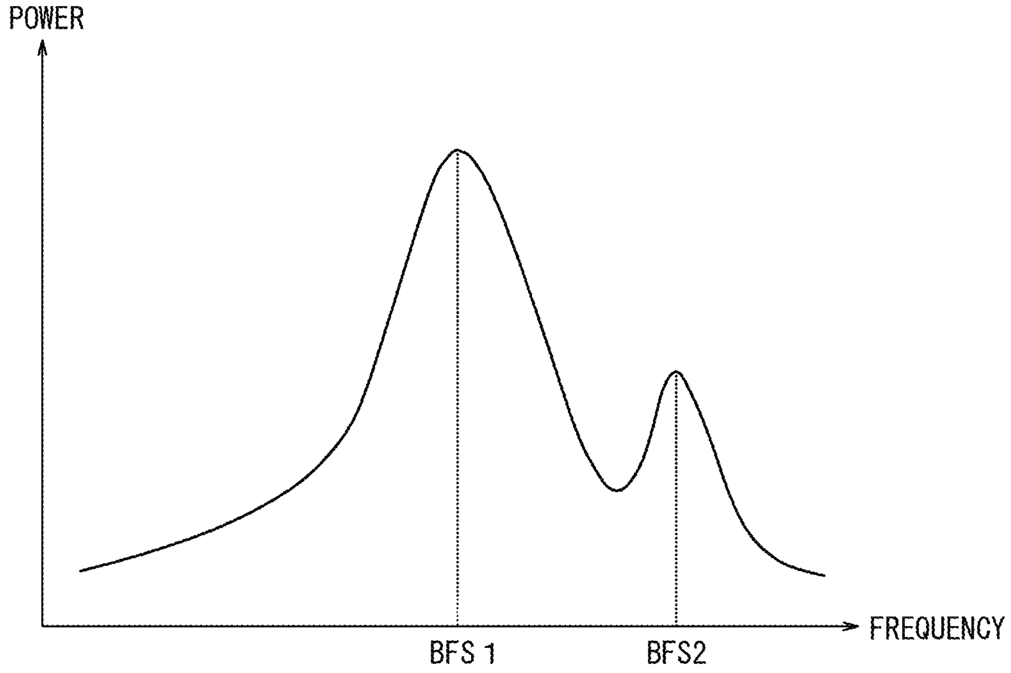
FIG. 2B is a graph of a Brillouin gain spectrum in a measurement segment including an anomalous portion.

FIG. 2A illustrates a measurement result of the BGS in the first measurement segment. FIG. 2B illustrates a measurement result of the BGS in the second measurement segment. In FIGS. 2A and 2B, the horizontal axis represents frequency. The vertical axis represents the power of each frequency component. The BGS in the first measurement segment illustrated in the graph of FIG. 2A has one peak. The frequency of the peak is BFS1. The BGS in the second measurement segment illustrated in the graph of FIG. 2B has two peaks. The frequencies of the peaks are BFS1 and BFS2. The BFS1 is the frequency of a peak that appears when there is no anomaly in the characteristic of the optical fiber under test 980. On the other hand, the BFS2 is the frequency of a peak that appears when there is an anomaly in the characteristic of the optical fiber under test 980.

In other words, in a case in which the BGS includes the BFS1 and does not include the BFS2, as illustrated in FIG. 2A, the segment in which the BGS is measured includes no anomalous portion 982 of the optical fiber under test 980. In a case in which the BGS includes both the BFS1 and the BFS2, as illustrated in FIG. 2B, the segment in which the BGS is measured includes the anomalous portion 982 of the optical fiber under test 980.

Here, the optical fiber characteristic measurement apparatus 90 according to the comparative example detects only one peak from the BGS and calculates only one BFS. Then, by detecting the BFS1 from the BGS illustrated in FIG. 2A, the optical fiber characteristic measurement apparatus 90 recognizes that the first measurement segment includes no anomalous portion 982 and determines that the first measurement segment is normal. On the other hand, by detecting only the BFS1 from the BGS illustrated in FIG. 2B, the optical fiber characteristic measurement apparatus 90 cannot recognize that the second measurement segment includes the anomalous portion 982 and cannot determine that the second measurement segment is anomalous.

Therefore, the optical fiber characteristic measurement apparatus 90 according to the comparative example may miss the fact that a measurement segment is anomalous when the anomalous portion 982 is included in only part of the measurement segment, because the optical fiber characteristic measurement apparatus 90 detects only one peak from the BGS.

Figure 3:
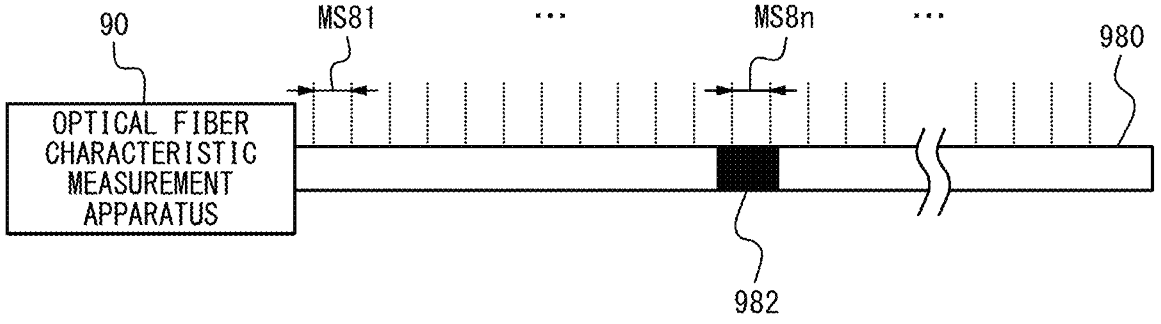
FIG. 3 is a diagram illustrating measurement segments set narrowly by the apparatus according to the comparative example.

The optical fiber characteristic measurement apparatus 90 according to the comparative example may shorten the measurement segments to increase the resolution of the characteristic of the optical fiber in its length direction so as not to miss the anomalous portion 982. As illustrated in FIG. 3, the optical fiber characteristic measurement apparatus 90 controls the modulation frequency and amplitude of the pump light so that a BGS can be measured in each measurement segment, such as a first measurement segment represented by MS 81 or the n-th measurement segment represented by MS8n. Here, the optical fiber characteristic measurement apparatus 90 sets the measurement segments so that the entirety of at least one measurement segment is included in the anomalous portion 982. In FIG. 3, the entirety of the n-th measurement segment is included in the anomalous portion 982.

Figure 4:
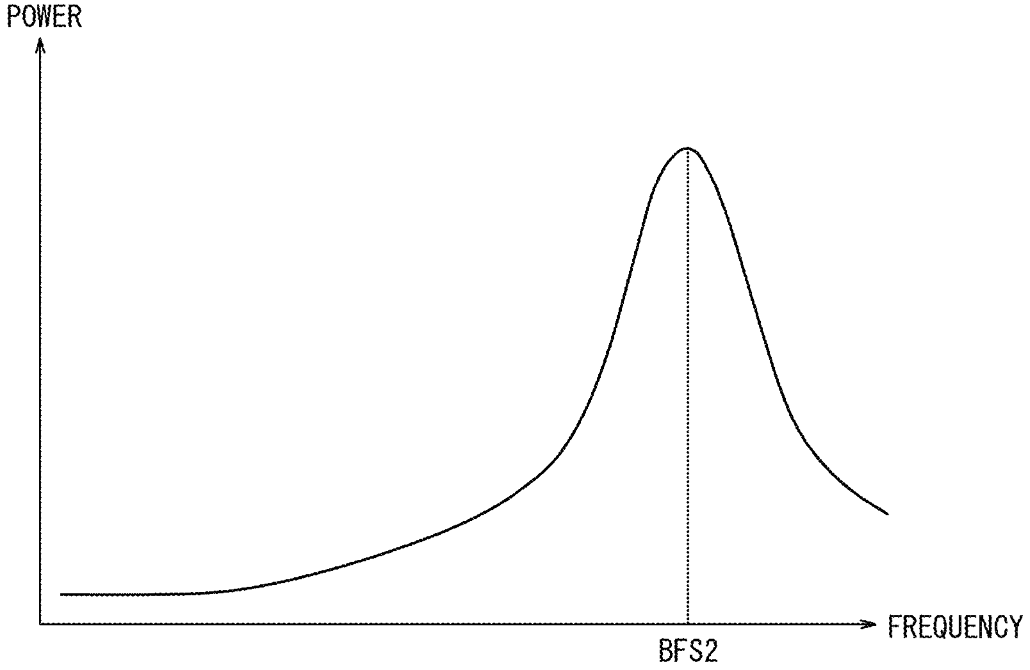
FIG. 4 is a graph of a Brillouin gain spectrum in a measurement segment including an anomalous portion in its entirety.

FIG. 4 illustrates a measurement result of the BGS in the n-th measurement segment. In FIG. 4, the horizontal axis represents frequency. The vertical axis represents the power of each frequency component. The BGS in the n-th measurement segment has one peak. The frequency of that peak is the BFS2. The optical fiber characteristic measurement apparatus 90 according to the comparative example can determine that the n-th measurement segment is anomalous.

However, as described above, increasing the resolution of the characteristic of the optical fiber in the length direction increases a time required for the measurement. In addition, in a case in which the length of the anomalous portion 982 of the optical fiber under test 980 is unknown, it is not known how far the resolution should be increased. Therefore, the optical fiber characteristic measurement apparatus 90 according to the comparative example may increase the resolution more than necessary.

Therefore, the present disclosure describes an optical fiber characteristic measurement apparatus 10 (see FIG. 5) that is less likely to miss an anomaly in an optical fiber even with low resolution.

(Example of Configuration of Optical Fiber Characteristic Measurement Apparatus 10 According to Present Disclosure)

An embodiment of the optical fiber characteristic measurement apparatus 10 that measures the characteristic of an optical fiber will be described below with reference to FIG. 5. The optical fiber characteristic measurement apparatus 10 according to the embodiment of the present disclosure measures the characteristic of an optical fiber under test (FUT) 80 using the BOCDR. The characteristic of the optical fiber under test 80 includes, for example, a temperature distribution or a strain distribution of the optical fiber under test 80 in a length direction, vibration of the optical fiber under test 80, or another characteristic of the optical fiber under test 80. The frequency, amplitude, spectrum, or another characteristic of scattered or reflected light occurring in the optical fiber under test 80 varies depending on a physical quantity such as temperature or strain affecting the optical fiber under test 80. Therefore, the optical fiber under test 80 itself is used as a sensor in the optical fiber characteristic measurement apparatus 10.

Figure 5:
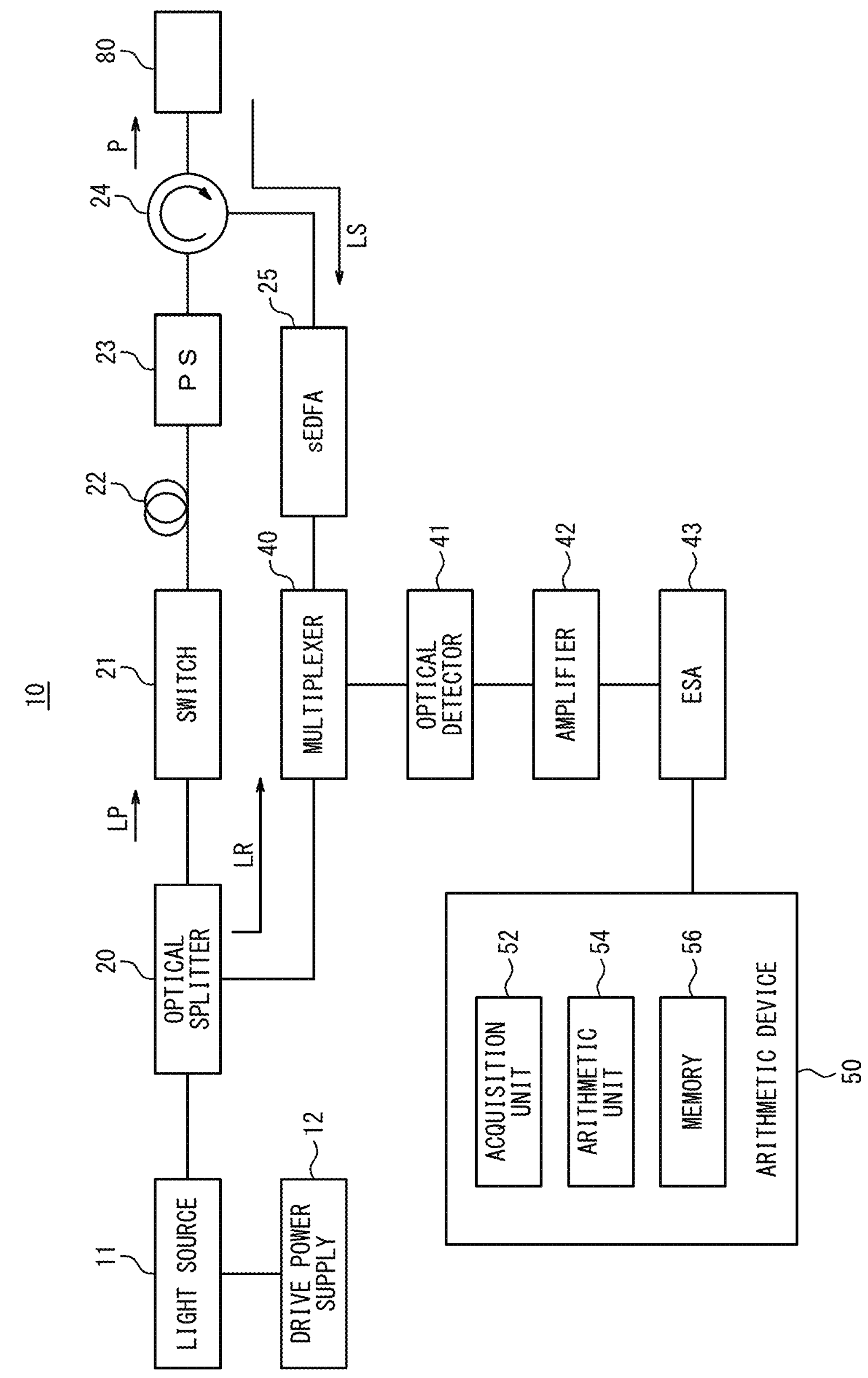
FIG. 5 is a block diagram illustrating an example of the configuration of an optical fiber characteristic measurement apparatus according to the present disclosure.

As illustrated in FIG. 5, the optical fiber characteristic measurement apparatus 10 according to the embodiment of the present disclosure is provided with a light source 11, an optical splitter 20, a multiplexer 40, an optical detector 41, an amplifier 42, an electric spectrum analyzer (ESA) 43, and an arithmetic device 50.

The light source 11 emits frequency-modulated light. The light source 11 may be configured with, for example, a semiconductor laser device such as a distributed feed-back laser diode (DFB-LD). The optical fiber characteristic measurement apparatus 10 is further provided with a drive power supply 12. The drive power supply 12 drives the light source 11 based on a modulation signal with a modulation frequency ($f_m$) for frequency modulation. The light source 11 emits the light whose frequency is modulated based on the modulation frequency ($f_m$).

The optical splitter 20 splits input light into two or more directions. In this embodiment, the optical splitter 20 splits the light input from the light source 11 into pump light LP and reference light LR. The optical splitter 20 may be configured with, for example, an optical coupler.

The optical fiber characteristic measurement apparatus 10 is further provided with a switch 21, a delay fiber 22, a polarization scrambler (PS) 23, and a circulator 24 between the optical splitter 20 and the optical fiber under test 80.

The switch 21 converts the pump light LP into pulsed light P by chopping. The pulsed light P travels through the delay fiber 22, the polarization scrambler 23, and the circulator 24 to the optical fiber under test 80. The delay fiber 22 delays the progress of the pulsed light P for a predetermined time. The delay fiber 22 may include, for example, an optical fiber of a predetermined length. The polarization scrambler 23 controls polarization so that polarization components included in the pulsed light P approach uniformity in each direction of polarization.

The circulator 24 causes the pulsed light P, which has traveled from the optical splitter 20, to travel to the optical fiber under test 80. The circulator 24 also causes Brillouin scattered light LS, which has returned from the optical fiber under test 80, to travel to the multiplexer 40, instead of traveling to the optical splitter 20. The Brillouin scattered light LS is light occurring by Brillouin scattering in the optical fiber under test 80. The Brillouin scattering is a phenomenon that occurs in the optical fiber under test 80 when the pulsed light P enters the optical fiber under test 80.

The circulator 24 may be replaced by an optical coupler. The optical splitter 20 is also referred to as a first optical splitter. The circulator 24 is also referred to as a second optical splitter.

The multiplexer 40 combines two or more input lights and outputs the combined light as one light. In this embodiment, the multiplexer 40 combines the reference light LR and the Brillouin scattered light LS and outputs the combined light as one light to the optical detector 41. The multiplexer 40 may be configured with, for example, an optical coupler.

The optical detector 41 detects the intensity of the input light and outputs an electrical signal corresponding to the detected intensity of the light. The optical detector 41 may be configured with, for example, a photodiode (PD) or a phototransistor.

The amplifier 42 amplifies the electrical signal. The amplifier 42 may be configured with, for example, an amplifier. In this embodiment, the amplifier 42 is configured to amplify the signal in a radio frequency (RF) band that includes peak frequencies of a BGS, which is a spectrum of the Brillouin scattered light LS.

The ESA 43 performs spectral analysis of the signal amplified by the amplifier 42. In this embodiment, the ESA 43 performs the spectral analysis in the RF band.

The arithmetic device 50 is provided with an acquisition unit 52, an arithmetic unit 54, and a memory 56.

The acquisition unit 52 may include a communication interface that communicates with, for example, the ESA 43 or the drive power source 12 over a wire or wirelessly. The communication interface may be configured communicably based on a communication standard such as a local area network (LAN). The communication standard is not limited to the LAN but may be various other standards.

The arithmetic unit 54 may be configured with a processor, such as a central processing unit (CPU), or a dedicated circuit, such as a field programmable gate array (FPGA). The arithmetic unit 54 may be configured to execute a program that implements the functions of the arithmetic device 50.

The memory 56 may store various information used in operations of the arithmetic device 50, the program that implements the functions of the arithmetic device 50, or the like. The memory 56 may function as a work memory for the arithmetic unit 54. The memory 56 may be configured with, for example, a semiconductor memory. The memory 56 may be configured as an integral part of the arithmetic unit 54 or may be configured separately.

The arithmetic device 50 or the optical fiber characteristic measurement apparatus 10 may include an input device that accepts input from a user. The input device may include, for example, a keyboard or physical keys, a touch panel or a touch sensor, or a pointing device such as a mouse.

The arithmetic device 50 or the optical fiber characteristic measurement apparatus 10 may be provided with a display device. The display device may include various types of displays, such as a liquid crystal display, for example. The arithmetic device 50 or the optical fiber characteristic measurement apparatus 10 may be provided with an interface to output information to be displayed to an external display device. The arithmetic device 50 or the optical fiber characteristic measurement apparatus 10 may be provided with an audio output device such as a speaker. The arithmetic device 50 or the optical fiber characteristic measurement apparatus 10 may be provided with an interface to output audio information to an external speaker or the like.

(Example of Operations of Optical Fiber Characteristic Measurement Apparatus 10 According to Present Disclosure)

In the optical fiber characteristic measurement apparatus 10, the light source 11 emits the frequency-modulated (FM) light whose frequency is modulated based on the modulation frequency ($f_m$) under the control of the drive power supply 12.

The light emitted from the light source 11 is split into the pump light LP and the reference light LR by the optical splitter 20. The reference light LR travels to the multiplexer 40.

The pump light LP, after being split by the optical splitter 20, travels through the switch 21, the delay fiber 22, and the polarization scrambler 23 to the circulator 24. The delay fiber 22 can adjust a delay time of the pulsed light P by changing the length of the optical fiber. The delay fiber 22 is used to put a zero-order correlation peak, which does not move even when the modulation frequency ($f_m$) is swept, outside the optical fiber under test 80.

The circulator 24 causes the pulsed light P, which has traveled from the optical splitter 20, to travel to the optical fiber under test 80. The circulator 24 also causes the Brillouin scattered light LS, which has returned from the optical fiber under test 80, to travel to the multiplexer 40, instead of traveling to the optical splitter 20. The Brillouin scattered light LS is light that has occurred by the Brillouin scattering in the optical fiber under test 80. The Brillouin scattering is a phenomenon that occurs in the optical fiber under test 80 when the pulsed light P enters the optical fiber under test 80.

The operations of the optical splitter 20, which is also referred to as the first optical splitter, and the circulator 24, which is also referred to as the second optical splitter, can be translated as follows. The first optical splitter splits the frequency-modulated light into the pump light LP and the reference light LR, and causes the pump light LP to travel to the second optical splitter and the reference light LR to travel to the multiplexer 40. The second optical splitter causes the pump light LP to travel to the optical fiber under test 80 so that the pump light LP is incident on one end of the optical fiber under test 80. The second optical splitter also causes the Brillouin scattered light LS, which has occurred in and returned from the optical fiber under test 80, to travel to the multiplexer 40. In other words, the second optical splitter has the pump light incident on the one end of the optical fiber under test 80, and takes out the Brillouin scattered light LS having occurred in the optical fiber under test 80.

The optical fiber characteristic measurement apparatus 10 generates interference light by the multiplexer 40 by the interference between the frequency offset reference light LR and the Brillouin scattered light LS, detects the interference light by the optical detector 41, amplifies a detection signal by the amplifier 42, and performs spectral analysis of the amplified signal by the ESA 43. The ESA 43 outputs a spectrum analysis result of the signal of detecting the interference light to the arithmetic device 50.

Figure 6:
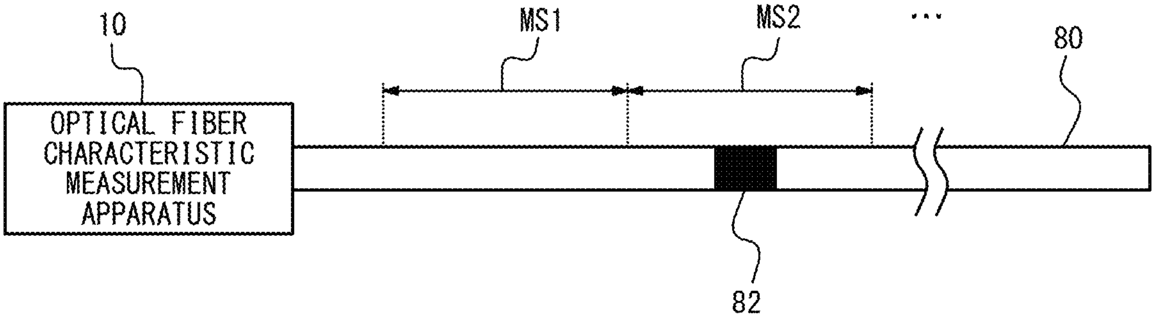
FIG. 6 is a diagram illustrating an example of measurement segments set by the apparatus according to the present disclosure.

As illustrated in FIG. 6, the optical fiber characteristic measurement apparatus 10 according to the present disclosure measures a Brillouin gain spectrum by having the pump light LP incident on the optical fiber under test 80. The optical fiber characteristic measurement apparatus 10 measures the characteristic of the optical fiber under test 80 by determining the characteristic of the optical fiber under test 80 based on a measurement result of the Brillouin gain spectrum.

In the optical fiber characteristic measurement apparatus 10, the arithmetic device 50 sets at least one measurement segment in the optical fiber under test 80, and determines whether the characteristic of each measurement segment is anomalous. For example, the arithmetic device 50 may set a first measurement segment represented by MS1 and a second measurement segment represented by MS2 in the optical fiber under test 80. The first and second measurement segments may be set such that the length of the first measurement segment is the same as the length of the second measurement segment, or the length of the first measurement segment is different from the length of the second measurement segment. In this embodiment, the first and second measurement segments are set such that the length of the first measurement segment is the same as the length of the second measurement segment.

The arithmetic device 50 controls the modulation frequency and amplitude of the modulated light, which is to be split into the pump light LP, so that the BGS in each of the first and second measurement segments can be measured. In other words, the light source 11 is configured such that the arithmetic unit 54 can control the amplitude of the modulated light, which determines the length of the measurement segments, and the modulation frequency of the modulated light, which determines the positions of the measurement segments. The arithmetic device 50 can acquire the BGS in each measurement segment by controlling the modulation frequency and amplitude of the modulated light. In other words, the arithmetic device 50 can move the measurement segments to the individual positions or change the length of the measurement segments by controlling the modulation frequency and amplitude of the modulated light.

In the optical fiber characteristic measurement apparatus 10 according to this embodiment, the positions and length of the measurement segments can be determined by controlling the modulation frequency and amplitude of the modulated light, which allows the measurement positions and spatial resolution to be switched instantaneously. In other words, random accessibility can be achieved.

The arithmetic unit 54 of the arithmetic device 50 may store, in the memory 56, the BGS acquired from the ESA 43 and information identifying the measurement segment in which the BGS has been measured, in correspondence with each other. The information identifying the measurement segment may include the distance from the end of the optical fiber under test 80 to the measurement segment. In other words, the information identifying the measurement segment may include a position at which a correlation peak appears in the optical fiber under test 80. The information identifying the measurement segment may include the length of the measurement segment. The information identifying the measurement segment may include the modulation frequency and amplitude of the pump light LP. The information identifying the measurement segment may include a time from when the pump light LP is incident on the optical fiber under test 80 until the Brillouin scattered light LS returns.

The arithmetic unit 54 may control the amplitude and modulation frequency of the modulated light based on the information stored in the memory 56.

Here, the optical fiber under test 80 has an anomalous portion 82 in which temperature, strain, or another characteristic is anomalous. The anomalous portion 82 is located in the second measurement segment.

A BGS in the first measurement segment, which includes no anomalous portion 82, is similar to the result illustrated in FIG. 2A above, and has one peak. The frequency of the peak is BFS1. A BGS in the second measurement segment, which includes the anomalous portion 82, is similar to the result illustrated in FIG. 2B above, and has two peaks. The frequencies of the peaks are BFS1 and BFS2. The BFS1 is the frequency of a peak that appears when there is no anomaly in the characteristic of the optical fiber under test 80. The peak that appears when there is no anomaly in the characteristic of the optical fiber under test 80 is also referred to as a normal peak. On the other hand, the BFS2 is the frequency of a peak that appears when there is an anomaly in the characteristic of the optical fiber under test 80. The peak that appears when there is an anomaly in the characteristic of the optical fiber under test 80 is also referred to as an anomalous peak.

The arithmetic unit 54 of the arithmetic device 50 according to the present disclosure detects multiple peaks and calculates multiple BFSs when a BGS includes the multiple peaks. The arithmetic unit 54 may detect the multiple peaks, for example, by performing a peak search on the BGS. The arithmetic unit 54 may detect peaks with powers that are twice or more as much as noise power. Thereby, noise is less likely to be falsely detected as peaks.

In an example of measurement of the optical fiber under test 80 illustrated in FIG. 6, the arithmetic unit 54 detects two peaks from the BGS in the second measurement segment illustrated in FIG. 2B, and calculates the BFS1 and the BFS2. In other words, the arithmetic unit 54 detects the normal peak and the anomalous peak from the BGS in the second measurement segment. In this case, the arithmetic unit 54 determines that part of the second measurement segment includes the anomalous portion 82.

Figure 7:
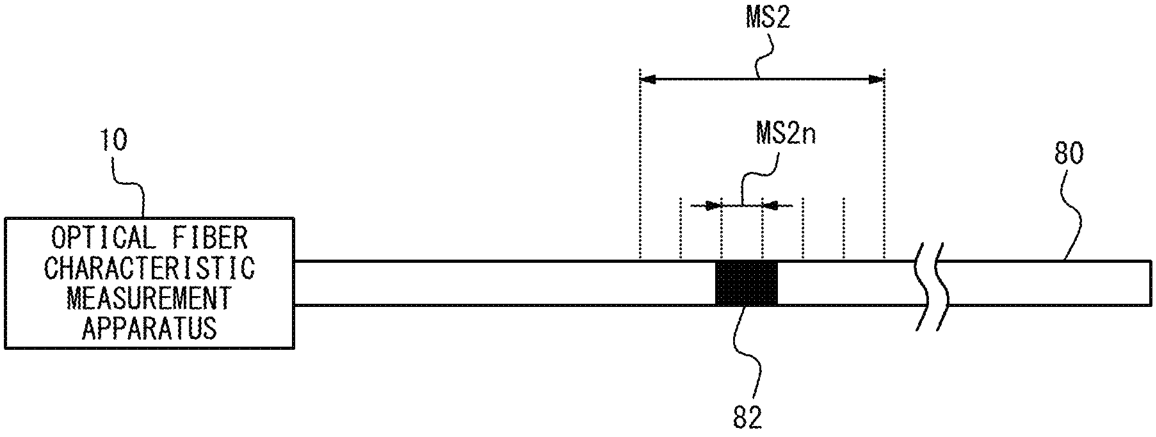
FIG. 7 is a diagram illustrating an example of subdivision of the measurement segment in FIG. 6.

When it is determined that part of a measurement segment includes the anomalous portion 82, the arithmetic unit 54 subdivides the measurement segment, and measures a BGS and detects peaks in each of the subdivided segments. When it is determined that part of the second measurement segment includes the anomalous portion 82, for example, as illustrated in FIG. 7, the arithmetic unit 54 subdivides the second measurement segment. In the example of FIG. 7, the entirety of a segment represented by MS2n is included in the anomalous portion 82.

When the arithmetic unit 54 can detect an anomalous peak, without detecting a normal peak, from a BGS in at least one segment of the subdivided segments, the arithmetic unit 54 can determine that the entirety of the segment is included in the anomalous portion 82. When the entirety of the segment is included in the anomalous portion 82, the position of the anomalous portion 82 is measured as the position of that segment.

When the arithmetic unit 54 cannot find, among the subdivided segments, a segment in which an anomalous peak is detected from the BGS without detecting a normal peak, the arithmetic unit 54 may further repeat the subdivision. The arithmetic unit 54 may repeat the subdivision until the arithmetic unit 54 finds a segment in which an anomalous peak is detected from the BGS without detecting a normal peak. The arithmetic unit 54 may further subdivide the subdivided segment or may redo the subdivision by shortening the length of subdividing the measurement segment.

In the optical fiber characteristic measurement apparatus 10 according to this embodiment, the length of the measurement segments can be determined by controlling the modulation frequency and amplitude of the modulated light, which allows the spatial resolution of the measurement to be switched instantaneously. As a result, the subdivision of the measurement segment can be easily realized.

<Example of Flowchart of Optical Fiber Characteristic Measurement Method>

Figure 8:
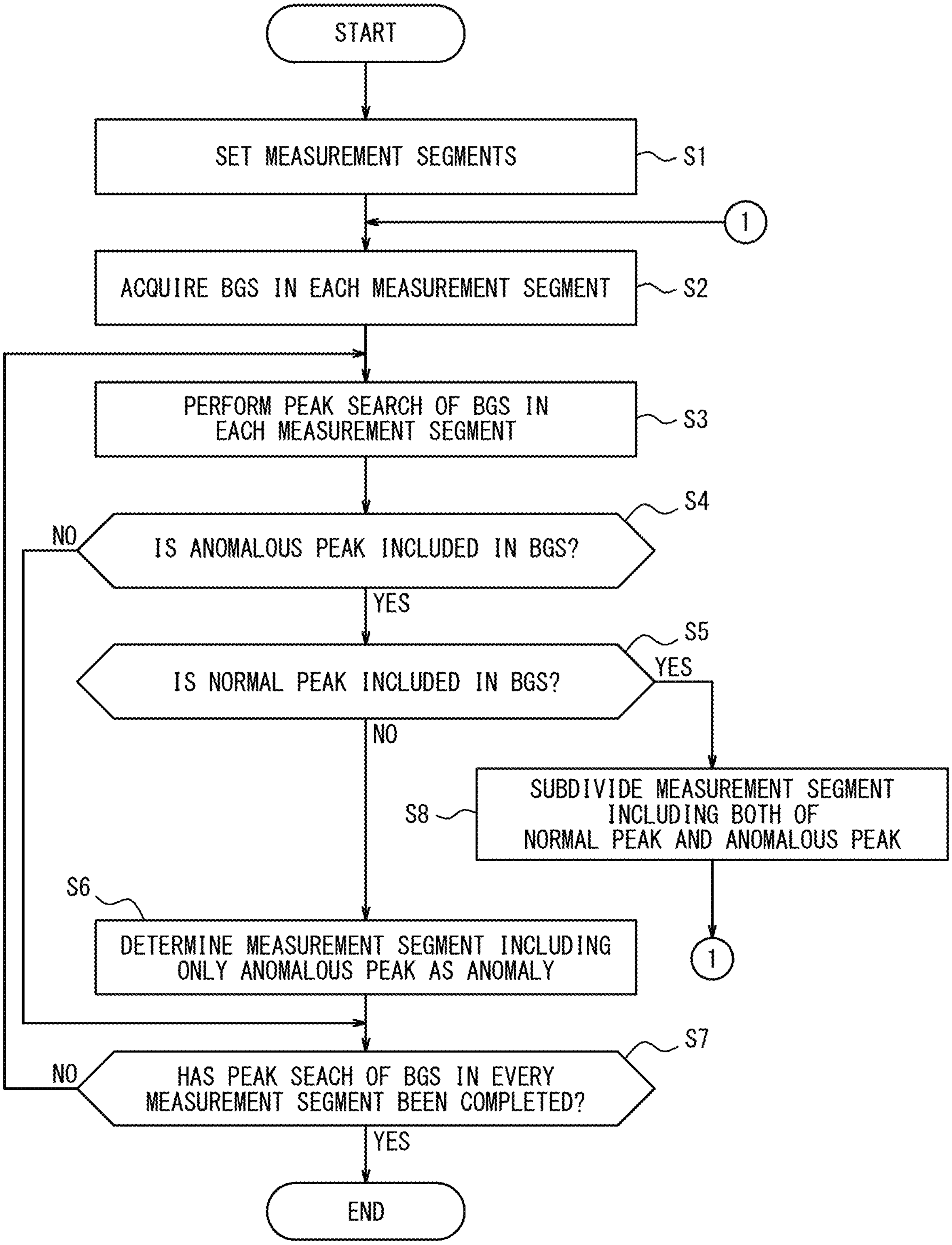
FIG. 8 is a flowchart illustrating an example of a procedure of an optical fiber characteristic measurement method according to the present disclosure.

The arithmetic device 50 of the optical fiber characteristic measurement apparatus 10 according to the present disclosure may measure the characteristic of the optical fiber under test 80 by executing an optical fiber characteristic measurement method including a procedure in the flowchart illustrated in FIG. 8. At least part of the optical fiber characteristic measurement method may be realized as an optical fiber characteristic measurement program to be executed by the arithmetic unit 54 or the like of the arithmetic device 50. The optical fiber characteristic measurement program may be stored in a non-transitory computer readable medium.

The arithmetic device 50 sets measurement segments in the optical fiber under test 80 (step S1). The arithmetic device 50 acquires a BGS in each measurement segment by having the light source 11 emit modulated light with a modulation frequency and an amplitude corresponding to the set measurement segments and having pump light LP incident on the optical fiber under test 80 (step S2).

The arithmetic device 50 performs a peak search of the BGS in each measurement segment (step S3). The arithmetic device 50 determines, for each measurement segment, whether the BGS includes an anomalous peak (step S4).

When the BGS includes no anomalous peak (step S4: NO), the arithmetic device 50 proceeds to the process of step S7.

When the BGS includes an anomalous peak (step S4: YES), the arithmetic device 50 determines whether the BGS includes a normal peak (step S5). When the BGS includes no normal peak (step S5: NO), the arithmetic device 50 determines, as an anomaly, the measurement segment in which the BGS including only the anomalous peak has been measured (step S6).

After determining that the BGS includes no anomalous peak in the process of step S4 or after determining the measurement segment as the anomaly in the process of step S6, the arithmetic device 50 determines whether the peak search of the BGS in every measurement segment has been completed (step S7). When the peak search of the BGS in every measurement segment has not been completed (step S7: NO), the arithmetic device 50 returns to the process of step S3 to execute the peak search of a BGS in a measurement segment for which the peak search has not been completed. When the peak search of the BGS in every measurement segment has been completed (step S7: YES), the arithmetic device 50 terminates the execution of the procedure of the flowchart in FIG. 8.

When it is determined, in the process of step S5 (step S5: YES), that the BGS includes the normal peak, the arithmetic device 50 subdivides the measurement segment in which the BGS including both of the normal peak and the anomalous peak has been measured (step S8). After performing the process of step S8, the arithmetic device 50 returns to the process of step S2, and acquires a BGS and performs a peak search for a subdivided segment. As described above, the arithmetic device 50 may repeat the subdivision until the arithmetic device 50 finds a segment in which an anomalous peak is detected from a BGS without detecting a normal peak.

CONCLUSION

As described above, the optical fiber characteristic measurement apparatus 10 according to the present disclosure can detect the multiple peaks from the BGS measured in each measurement segment of the optical fiber under test 80, thus allowing the detection of the anomalous peak even when the anomalous portion 82 is present in only part of the measurement segment. As a result, even when the measurement segment is set widely, it is unlikely to miss the presence of the anomalous portion 82 included in the optical fiber under test 80. In addition, allowing the measurement segment to be set widely reduces a measurement time.

When the anomalous portion 82 is present in part of the measurement segment, only the measurement segment is subdivided and measured. Therefore, the measurement time is reduced as compared to measuring the entire optical fiber under test 80 in smaller measurement segments.

The embodiment according to the present disclosure has been described above with reference to the drawings. The specific configuration is not limited to this embodiment, but includes various modifications within the scope that does not depart from the purpose of the present disclosure.

The optical fiber characteristic measurement apparatus 10 according to the embodiment described above has been described as measuring the BGS by the BOCDR. The optical fiber characteristic measurement apparatus 10 may be configured to measure the BGS by the Brillouin optical correlation domain analysis (BOCDA).

The invention claimed is:

1. An optical fiber characteristic measurement apparatus comprising:

an arithmetic unit configured to measure a characteristic of an optical fiber under test by detecting multiple peaks in a Brillouin gain spectrum of Brillouin scatted light occurring in the optical fiber under test and calculating multiple Brillouin frequency shifts, the arithmetic unit is configured to measure the fiber characteristic by detecting multiple peaks that are simultaneously present in a single Brillouin gain spectrum, obtained from a single measurement segment of the optical fiber under test, and calculating multiple Brillouin frequency shifts corresponding to those multiple peaks in that single spectrum, the arithmetic unit is configured to detect the multiple peaks with powers that are twice or more as much as noise power.

2. The optical fiber characteristic measurement apparatus according to claim 1, wherein the arithmetic unit is configured to:

set, at one or more positions in the optical fiber under test, a measurement segment in which the characteristic of the optical fiber under test is to be measured;

measure a Brillouin gain spectrum in the measurement segment set at each position;

determine, as an anomaly, the characteristic of the measurement segment in which the Brillouin gain spectrum including an anomalous peak and no normal peak has been measured;

subdivide the measurement segment in which the Brillouin gain spectrum including both of a normal peak and an anomalous peak has been measured;

measure a Brillouin gain spectrum in each subdivided segment; and determine whether each subdivided segment is anomalous.

3. The optical fiber characteristic measurement apparatus according to claim 2, further comprising:

a light source configured to emit modulated light to be incident on the optical fiber under test, wherein the light source is configured such that the arithmetic unit can control an amplitude and modulation frequency of the modulated light, the amplitude of the modulated light determines a length of the measurement segment, the modulation frequency of the modulated light determines the position of the measurement segment.

4. The optical fiber characteristic measurement apparatus according to claim 3, further comprising:

a memory configured to store the measured Brillouin gain spectrum and information identifying the measurement segment in which the Brillouin gain spectrum has been measured, in correspondence with each other, wherein the arithmetic unit is configured to control the amplitude and modulation frequency of the modulated light based on information stored in the memory.

5. An optical fiber characteristic measurement method comprising:

(i) measuring a characteristic of an optical fiber under test by detecting multiple peaks in a Brillouin gain spectrum of Brillouin scatted light occurring in the optical fiber under test and calculating multiple Brillouin frequency shifts, the step (i) further comprising measuring the fiber characteristic by detecting multiple peaks that are simultaneously present in a single Brillouin gain spectrum, obtained from a single measurement segment of the optical fiber under test, and calculating multiple Brillouin frequency shifts corresponding to those multiple peaks in that single spectrum, the step (i) further comprising detecting the multiple peaks with powers that are twice or more as much as noise power.

6. The optical fiber characteristic measurement apparatus according to claim 1, wherein the arithmetic unit is configured to detect the multiple peaks in one Brillouin gain spectrum of Brillouin scatted light occurring in the optical fiber under test and calculating multiple Brillouin frequency shifts.

7. The optical fiber characteristic measurement apparatus according to claim 2, wherein the arithmetic unit is configured to repeat subdividing the measurement segment until the arithmetic unit finds a subdivided segment in which an anomalous peak is detected without detecting a normal peak.

* * * * *